United States Patent [19]

Gbordzoe et al.

[11] Patent Number: 5,560,900
[45] Date of Patent: Oct. 1, 1996

[54] TRANSPORT PARTIAL OXIDATION METHOD

[75] Inventors: Eusebius A. Gbordzoe, Houston; Gunnar B. Henningsen, Sugar Land; Darryl W. Hertz, Katy, all of Tex.

[73] Assignee: The M. W. Kellogg Company, Houston, Tex.

[21] Appl. No.: 305,241

[22] Filed: Sep. 13, 1994

[51] Int. Cl.$^6$ ................. C01B 3/24; C01B 3/26
[52] U.S. Cl. .................. 423/650; 252/373; 423/652
[58] Field of Search .............. 252/373; 423/650, 423/652

[56] References Cited

U.S. PATENT DOCUMENTS

| | | | |
|---|---|---|---|
| 2,803,530 | 8/1957 | Ludeman | 423/650 |
| 3,304,249 | 2/1967 | Katz | 423/DIG. 16 |
| 3,347,064 | 8/1982 | Reh et al. | 252/373 |
| 4,017,272 | 4/1977 | Anwer et al. | 252/373 |
| 4,560,547 | 12/1985 | Schara et al. | 423/652 |
| 4,579,070 | 4/1986 | Lin et al. | 110/345 |
| 4,752,303 | 6/1988 | Materne et al. | 252/373 |

OTHER PUBLICATIONS

Pitcher et al., "The Pinon Pine Project," Foster Wheeler USA Corp., Sierra Pacific Power Co. and M. W. Kellogg Co., 1991.
Poole et al., "The Pinon Pine IGCC Project Overview and Update," Ninth Annual International Pittsburgh Coal Conferences, 13 Oct., 1992.
Gbordzoe et al., "Development of the M. W. Kellogg's Pressurized Transport Combustor for Power Applications," Pittsburgh Coal Conference, 13 Oct. 1992.
Motter, "Status of the Pinon Pine IGCC Project," Sierra Pacific Power Co., 12 Aug. 1992.
Campbell, "Operating Experience with FBC's in the Petroleum Industry," EPRI 1988 Seminar on Fluidized Bed Combustion Technology for Utility Applications, Palo Alto, CA, 3 May 1988.
Campbell, "Development of a Transport Mode Pressurized Circulating Fluid Bed Combustor," Power Generation '88 Conference, Dec. 1988.
O'Donnell, "An Advance Concept in Pressurized Fluid Bed Combustion," American Society of Mechanical Engineers (ASME), pp. 183–191, 1991.

*Primary Examiner*—Wayne Langel
*Attorney, Agent, or Firm*—The M. W. Kellogg Company

[57] ABSTRACT

Disclosed are a process for converting low value hydrocarbon streams to hydrogen and/or synthesis gas products and a transport reactor useful in the conversion process. In the transport reactor, carbon produced is deposited on a circulating inert particulated carrier. The carbon deposited is partially oxidized to supply heat for the endothermic reactions. Reaction effluent gas leaving the transport reactor can be processed to remove particulate matter, sulfur compounds, and acid gases; condense the steam; and separate hydrogen from carbon monoxide to produce a purified hydrogen and/or syngas product. The present process has the flexibility to continuously handle all types of low value hydrocarbon feeds substantially without process disruption.

14 Claims, 3 Drawing Sheets

TRANSPORT PARTIAL OXIDATION METHOD

FIELD OF THE INVENTION

The present invention relates to a process and apparatus employing a transport reactor operating at a relatively low temperature and substoichiometric oxidative conditions for converting low value hydrocarbon streams to hydrogen or synthesis gas.

BACKGROUND OF THE INVENTION

Waste and/or residual streams of low or negative value produced in refineries and petrochemical plants have typically posed a problem for re-use or disposal. A common suggestion is to use the waste streams for their heating value in combustion processes. Examples include vent gas containing hydrocarbons, carbon dioxide, carbon monoxide and steam; metal-containing sludges and gums; hydrocarbon-in-water emulsion streams (e.g. from petroleum emulsion breaking and dewatering); aromatic solvent-containing streams; spent caustic streams; coal dust slurdes; decoking offgas; coke solids; and the like. However, such streams are typically classified as hazardous waste. Disposal of streams so classified often requires extensive management to minimize adverse environmental impact. Thus, the benefits to be obtained by burning such streams are limited by the costs imposed by management requirements.

A high temperature combustion process is known for obtaining clean, environmentally acceptable heating value from waste streams which are otherwise difficult and expensive to dispose. In this high temperature process, feed to the high temperature flame is mixed with a nearly stoichiometric amount of oxygen and injected into the combustion zone wherein the hydrocarbons in the feed are burned to form primarily carbon dioxide and water at a temperature of 3000° F. Heat produced is then recovered for utilities production.

Several drawbacks to the above process have been experienced. For example, waste stream production in a plant typically varies extensively as to rate and composition. Where the hydrocarbon to oxygen ratio fluctuates quickly, too much hydrocarbon results in the formation of soot, whereas too little hydrocarbon causes the flame to go out. Complicated measures must generally be undertaken to smooth out these variations in the feed, usually elaborate blending systems and redundant feed systems.

Conversion of a hydrocarbon feed to a synthesis gas containing carbon monoxide for methanol production and/or hydrogen for ammonia production, hydrogenation and other uses is well known in the art. A hydrocarbon stream is converted usually in the presence of steam at an elevated temperature to produce carbon monoxide and hydrogen. It is also known that carbon monoxide reacts with steam at an elevated temperature in a shift reaction to produce additional hydrogen.

It would be advantageous to be able to convert diversely composed low value hydrocarbon process streams into one or more valuable product streams such as hydrogen and/or syngas ($H_2$+CO) to avoid the production of waste streams. In addition, it would be advantageous if the conversion process had the versatility to handle feeds of varying composition in continuous operation without upset. Further, it would be advantageous to operate a transport conversion reactor at a relatively low temperature, with reduced oxygen consumption and enhanced efficiency.

SUMMARY OF THE INVENTION

Low value hydrocarbon streams are efficiently processed in an in-process, closed-loop processing unit comprising a transport conversion reactor operating under low temperature, substoichiometric oxidative conditions to produce a valuable syngas and/or hydrogen product that can be recycled to the process from which the low-value streams are obtained. By utilizing the low-value streams in-process, the quantity of waste streams requiring out-of-process disposal can be sharply curtailed. By employing a transport reactor wherein carbon deposited on circulating particles is partially oxidized to supply the heat to drive endothermic reactions such as steam pyrolysis and CO shift, the reactor has the flexibility for continuous operation, while receiving feeds of varying hydrocarbon composition and water content, without disrupting the partial oxidation reaction. In addition, the reactor can be operated at a lower temperature with reduced oxygen feed and improved efficiency in comparison to prior art waste stream combustion techniques.

Benefits to a refinery, in particular, include plant-wide pollution source reduction and curtailment of offgas and liquid streams produced, for example, in decoking operations. The present process converts the low value hydrocarbon stream to useful products, such as hydrogen and/or syngas, which can be reduced and used in the process from which the low value streams were obtained. As a result, the amount of carbon dioxide produced is reduced. In addition, there is a significant reduction in heavy metal volatilization (due to a much lower reactor operating temperature).

In one aspect, the present invention provides a transport partial oxidation processing unit for converting low-value hydrocarbon streams to hydrogen or synthesis gas. The unit includes an air plant for forming an oxygen-enriched stream. Lines (e.g. pipes or conduits) are provided for supplying the oxygen stream and a raw hydrocarbon stream to a transport partial oxidation reactor comprising (1) a partial oxidation zone for substoichiometrically oxidizing carbon deposited on circulating particles, (2) a riser for receiving a mixture of the raw hydrocarbon stream and products from the partial oxidation zone, producing an effluent comprising hydrogen, light hydrocarbons, carbon monoxide, and carbon dioxide, and depositing carbon on the particles from the riser effluent, and (3) a separation zone for recovering particles for recirculation to the partial oxidation zone and forming a gas product essentially free of particles. A waste heat boiler is provided for recovering heat from and cooling the gas product from the transport reactor.

A filter is provided for recovering particulates from the cooled gas product and producing an essentially particulate-free gas product. A recirculation line is provided for circulating water to a tower to quench the particulate-free gas product. A hydrogen separation unit is provided for separating the quenched gas product into an enriched hydrogen stream and a light hydrocarbon stream. A controller is provided for adjusting a rate of the supply of the oxygen stream to the partial oxidation zone and to maintain the temperature of the riser effluent substantially between about 870° C. (about 1600° F.) and about 1090° C. (about 2000° F.), in response to variations in a rate and carbon composition of the raw hydrocarbon stream, and to deposit a carbon inventory on the circulating particles substantially between about 0.5 and about 40 percent by weight of the circulating particles.

The raw hydrocarbon stream fed to the unit can be subject to fluctuation in water content substantially between 0 and about 40 percent by weight of the raw hydrocarbon stream, in carbon content substantially between about 75 and about 95 percent by weight of the raw hydrocarbon stream on a dry basis, and in atomic H:C ratio substantially between about 0.5 and about 4.0. The raw hydrocarbon stream preferably comprises vent hydrocarbon gases, residual liquid hydrocarbon streams, refinery solids or a combination thereof having an overall dry basis H:C atomic ratio of about 1–2. In a preferred embodiment, the present unit includes a first feed line to the partial oxidation reactor for the vent hydrocarbon gases, and a second feed line for the liquid hydrocarbons and any solid components. A line is preferably provided in the unit for supplying steam to the riser at a rate such that the weight ratio of total water in the steam and raw hydrocarbon stream to hydrocarbon in the raw hydrocarbon stream is from about 0.3 to about 0.5.

The oxidation zone of the transport partial oxidation reactor is preferably adapted for oxidizing the carbon deposited on the circulating particles with a substoichiometric supply of the oxygen stream to form a stream of partial oxidation products essentially free of reactive oxygen. A feed injection zone is preferably adapted for continuously introducing the raw hydrocarbon stream into the stream of partial oxidation products to form a mixture thereof, and the riser for receiving the mixture from the feed injection zone. The reactor preferably includes a particulates holdup zone for receiving the recovered particles having carbon deposited thereon, a transfer line for conveying particles from the holdup zone to the partial oxidation zone, and a charge of particles including carbon deposited thereon in the particulates holdup zone and recirculating through the riser, separation zone and transfer line in an amount sufficient to sustain substantially continuous operation of the oxidation and feed injection zones. A line is preferably provided for purging a portion of the particles recovered from the separation zone of the transport partial oxidation reactor. A metal leaching or fixation system can be used for processing the purged particles and producing a solid or fixed metal product.

In another aspect, the present invention provides a method for low temperature conversion of low value hydrocarbon streams to hydrogen or synthesis gas. As step (a), a raw hydrocarbon stream is introduced into a continuous stream of partial oxidation products containing finely divided particles. As step (b), the resulting mixture from step (a) is passed through an essentially adiabatic pyrolysis zone under transport conditions to produce an effluent of hydrogen, light hydrocarbons, carbon monoxide and carbon dioxide, and to deposit carbon on the particles. In step (c), the carbon-coated particles from the product of step (b) are recovered to obtain a synthesis gas essentially free of particles. In step (d), a primary portion of the recovered particles and a substoichiometric amount of reactive oxygen are continuously supplied to a partial oxidation zone to form the stream of partial oxidation products for the hydrocarbon introduction step (a). In step (e), the amount of reactive oxygen supplied to the partial oxidation zone in response to substantial fluctuations in the raw hydrocarbon stream, selected from mass flow rate, water content, carbon content of the hydrocarbon, atomic ratio of H:C in the hydrocarbon, and combinations thereof, is adjusted to maintain an outlet temperature of the pyrolysis zone in step (b) substantially between about 870° C. (about 1600° F.) and about 1090° C. (about 2000° F.), and to obtain particles from the recovery step (c) having an average carbon deposition content substantially between 0.5 and 40 percent by weight.

As an example of the method of the invention, the raw hydrocarbon stream can comprise an emulsion from an oil-water separator or an air flotation tank. The raw hydrocarbon stream can contain metal, which is sorbed onto the particles in step (b), and the synthesis gas from step (c) is essentially free of metal.

The particles are preferably supplied to the partial oxidation zone in step (d) at a rate from about 10 to about 250 times the mass flow rate of the raw hydrocarbon stream in step (a). Oxygen substantially free of nitrogen is preferably fed to the partial oxidation zone in step (d). Reactive oxygen is preferably supplied to the partial oxidation zone in step (d) in an amount less than about 5 percent of stoichiometric relative to carbon on the particles supplied to the partial oxidation zone. As a further step, steam is supplied to the pyrolysis zone for shift conversion to hydrogen in step (b) as well as gasification of some carbon. The raw hydrocarbon stream has a water content from about 0 to about 40 percent by weight, has from 75 to 95 percent carbon on a dry basis, and has a dry basis atomic H:C ratio from 0.5 to 4, but preferably from 1 to 2. Steam can be supplied to an inlet of the pyrolysis zone in an amount to provide a weight ratio of water from the steam and the raw hydrocarbon stream to hydrocarbon in the raw hydrocarbon stream of from about 0.3 to about 0.5. The hydrocarbon introduced in step (a) can contain aromatic rings, and the synthesis gas and carbon deposited on the inorganic particles from step (c) are essentially free of aromatic ring compounds. The particles in step (a) can comprise spent fluidized catalytic cracking catalyst or other suitable fluidizable particles. The mixture in step (b) can include a minor amount of caustic. As another step, the synthesis gas from step (c) is preferably quenched to substantially inhibit tar formation.

DETAILED DESCRIPTION OF THE INVENTION

Low value hydrocarbon streams, either solid, liquid or gas, or any combination thereof, are converted to syngas and/or hydrogen product streams by introducing the hydrocarbons in a continuous fashion to a riser of a transport reactor of the present invention, wherein the hydrocarbons are cracked and pyrolyzed, and solid carbon is produced and deposited on a particulate carrier circulated in the reactor. The energy required for the endothermic cracking and pyrolysis reactions is obtained by a substoichiometric partial oxidation of the deposited carbon. The present conversion reactor can be operated in conjunction with reaction effluent clean-up units to form an in-process, closed-loop method for producing syngas and/or hydrogen products suitable for use, for example, in the same manufacturing plant (e.g. a refinery) from which the low value hydrocarbon stream was obtained. In such a manner, low value hydrocarbon streams can be cleanly converted into valuable products. Concurrently, plant-wide source reduction can be implemented employing the in-process, closed-loop conversion method.

Figure 1:
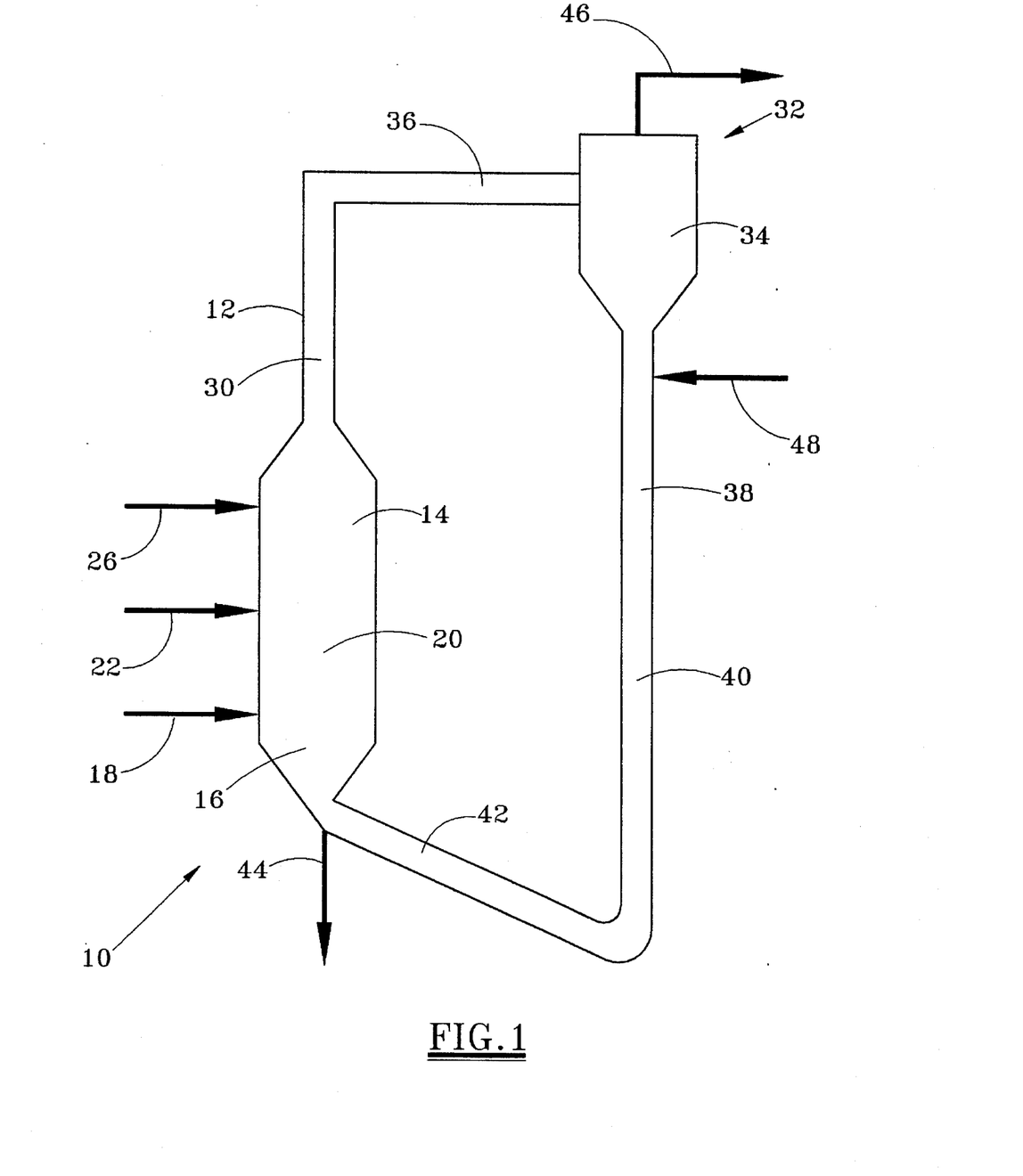
FIG. 1 is a schematic representation of the low temperature, partial oxidation transport reactor of the present invention.

Referring to FIG. 1, a reactor 10 of the present invention operating in the transport hydrodynamic regime comprises a riser 12 above a mixing zone 14. The mixing zone 14 includes a lower partial oxidation zone 16 wherein at least a portion of carbon deposited on a recirculating particulate carrier is oxidized to form a high velocity stream of substoichiometric combustion products (primarily carbon monoxide) and finely divided particles.

An oxygen supply is introduced to the partial oxidation zone 16 through line 18. The oxygen supply is generally fed at a rate suitable to control the temperature of the partial oxidation zone 16 and the riser 12 and can comprise air, oxygen-enriched air, mixtures of oxygen and inert gas such as nitrogen or argon, pure oxygen, or the like. A molar ratio of oxygen to carbon deposited on the circulating particles is maintained at a substoichiometric proportion to promote the formation of carbon monoxide over carbon dioxide in the partial oxidation zone 16. The oxygen supplied is preferably less than 5 percent of the stoichiometric amount of oxygen required for complete combustion of all the carbon fed to the partial oxidation zone 16 to carbon dioxide so that the resultant substoichiometric combustion products are essentially free of unreacted oxidant.

A feed injection zone 20 is preferably disposed in the mixing zone 14 above the partial oxidation zone 16. A hydrocarbon feed stream is injected through line 22 into the feed injection zone 20 and mixed with the high velocity stream of effluents and particles from the partial oxidation zone 16. Heat produced in the partial oxidation zone 16 is used in the mixing zone 14 and riser 12 to crack any high molecular weight hydrocarbons in the feed into lower molecular weight products, including lower hydrocarbons and carbon. In addition, pyrolysis products including hydrogen, carbon monoxide, carbon dioxide and carbon are also produced by reaction with steam. In accordance with a feature of the present invention, a major portion of the carbon produced by the cracking and pyrolysis reactions is deposited on the inert particles from the partial oxidation zone 16.

The feed stream 22 can comprise hydrocarbon vent gas, residual hydrocarbon liquids, refinery solids and a combination thereof. As another feature of the present invention, the feed stream 22 can fluctuate in water content, carbon content and ratio of hydrogen to carbon depending on the type and availability of the residual and/or low value stream to be converted. The feed stream 22 can include water at a concentration of from 0 to about 40 percent by weight and carbon at a concentration of about 75 percent by weight to about 95 percent by weight. The feed stream 22 can have a hydrogen:carbon atomic weight ratio (on a dry basis) of from about 0.5 to about 4:1, preferably from 1 to 2:1.

Examples of suitable hydrocarbon feed streams which can be converted in the present invention include petroleum-in-water emulsions produced by dewatering units of petroleum production plants; aromatic solvents, bottoms liquids, and gum solids from petrochemical plants; and vent gases, decoking offgas, sludge and bottoms liquids, and coke solids produced in petroleum refineries. Additional examples of residual or low value hydrocarbon streams which can be used include oil shale, tar, asphalt, dusts from coal handling and plastic manufacturing plants, spent caustic streams, and the like.

The feed stream 22 can be introduced as a solution, slurry, emulsion, suspension, etc. of solids, liquids and gases depending on the state of the residual stream(s) to be converted. Typically, solid and gas components will be dissolved and/or suspended in a hydrocarbon carrier liquid for ease of handling and pumping. Alternatively, gaseous components can be introduced separately through a separate feed line (not shown). The hydrocarbon feed stream 22 can be introduced to the reactor mixing zone 14 in stages as desired depending, in part, on the composition of the feed, composition of the reaction effluent gas and process parameters of the reactor 10 to ensure smooth operation thereof.

Steam is preferably injected into the mixing zone 14 above the feed injection zone 20 via a line 26. The steam mixes with the rising high velocity stream of partial oxidation and partially cracked products adjacent the inlet to an essentially adiabatic pyrolysis zone 30 in the riser 12. Alternatively and/or additionally, steam can be injected with the hydrocarbon feed, particularly where the raw feed comprises volatile and/or gaseous hydrocarbon components. Steam can also be injected with the oxidant stream 18. A weight ratio of total water in the steam injection line 26 and the hydrocarbon feed stream 22 to hydrocarbon in the hydrocarbon feed stream 22 is between 0.3 to 0.5.

The effluents of the mixing zone 14 are passed under reducing conditions through the riser 12 wherein several endothermic reaction processes occur. Volatile hydrocarbons present in the feed are volatilized. Higher molecular weight hydrocarbons are cracked into lower molecular weight ($C_1$–$C_4$) hydrocarbons such as methane and ethane, and devolatilized carbon is deposited on the circulating particles. Steam reacts with carbon and the hydrocarbons to form hydrogen and carbon monoxide, and with carbon monoxide to form more hydrogen and carbon dioxide according to the well-known shift conversion reaction. Because the feed hydrocarbons are not subject to combustion processes, the formation of light hydrocarbons is enhanced.

The high velocity partial oxidation products induce a rapid internal recirculation flow of carrier particles in the riser 12 which act like a thermal flywheel to efficiently transfer heat from the partial oxidation zone 16 wherein the particles are heated by the exothermic oxidation reaction to the adiabatic pyrolysis zone 30 to supply heat for the endothermic cracking, gasification and shift reactions which occur in the reactor 10. The mass flow rate of carrier particles recirculated to the partial oxidation zone 16 is preferably from about 10 to about 250 times the mass flow rate of the feed to the mixing zone 14 through line 22. Materials suitable for use as carrier particles circulating in the reactor 10 are finely divided refractory materials which have a large surface area and are generally inert at the reaction conditions of the present process. Examples are particulated alumina and silica, and spent catalyst from a fluidized catalytic cracking (FCC) reactor.

Because the partial oxidation reaction is fueled by oxidizing carbon deposited on the carrier particles instead of the cracked hydrocarbon products (volatiles), concentrations of light hydrocarbons and carbon monoxide in the reaction effluent are enhanced in comparison to prior art processes. In addition, the reactor 10 has enhanced flexibility to accept a broad spectrum of feeds and feed compositions continuously without process disruption. Overall, a carbon inventory deposited on the circulating particles comprises between about 0.5 and about 40 percent of the total carrier weight.

The reaction effluent of the pyrolysis, gasification and shift reactions passes from the riser 12 into a separation zone 32 wherein carbon-coated particles are recovered from the reaction products to give a hydrogen and/or syngas stream which is essentially free of particulates. The separation zone 32 preferably comprises one or more high efficiency cyclone separation stages. Particle-laden gas from the riser 12 is fed to a cyclone 34 through line 36. Additional secondary cyclone separators (not shown) can be used if required.

The cyclone 34 includes a dipleg 38 having a particles holdup zone 40 for increasing the residence time of the hydrocarbon laden particles and a transfer line 42 for conveying the particles to the partial oxidation zone 16 at a rate sufficient to sustain continuous operation of the partial oxidation and feed injection zones 16, 20. The separation zone 32 further comprises a purge line 44 through which a portion of the solids from the holdup zone 40 can be purged from the reactor 10 to maintain a desired maximum concentration of metals on the solids. The bed is initially charged with the inert carrier via line 48 to satisfy hydraulic operating requirements. During operations, makeup inert carrier is added to maintain the desired metals concentration on the carrier and make up for overall losses of circulating carrier from the system. Gas having a reduced particulate content is recovered from the cyclone 34 via line 46.

Depending on the design operating pressure, the reactor 10 of the present invention operates at a temperature suitable for promoting the pyrolysis, gasification and shift reactions without the need for any catalytic activity of the circulating carrier. Such reactions can typically commence at a temperature as low as 788° C. (1450° F.). Preferably, the reactor 10 operates in a temperature range of from about 870° C. (about 1600° F.) to about 1090° C. (about 2000° F.), measured at an outlet from the riser 12. Compared to prior art processes, a lower operating temperature of the present invention reduces the amount of metal which is volatilized, and instead sorbs the metal onto the carrier particles. This avoids deposition and accumulation of metal on the walls of process equipment and piping, and facilitates recovery of the metal by recovery thereof from the circulating solids.

The operating temperature range is generally controlled by specifying the rate of oxidant supply to the partial oxidation zone 16 and the rate of carrier recirculation. In addition, heat can be optionally removed from the carrier in the holdup zone 40. Since the riser temperature and carbon deposition rate (i.e. carbon inventory) can fluctuate in response to variations in the feed rate and carbon composition of the hydrocarbon stream 22, a controller (not shown) can be used for adjusting a supply rate of the oxygen stream 18 to the partial oxidation zone 16 for maintaining the operating temperature of the riser 12 at a desired setpoint and ensuring a suitable carbon inventory in the reactor 10.

The transport reactor can be designed to operate at an elevated pressure, up to about 4.0 MPa (about 600 psig), to increase handling capacity per unit reactor cross-sectional area.

The raw product gas in line 36 is preferably purified in a downstream clean-up unit (see FIG. 2) prior to upstream use in the refinery or transmission to a methanol or ammonia plant, for example. The raw product gas can contain a varying concentration of hydrogen sulfide. Downstream clean-up can include heat recovery, trace particulates removal, tar inhibition, desulfurization, and component distillation.

Figure 2:
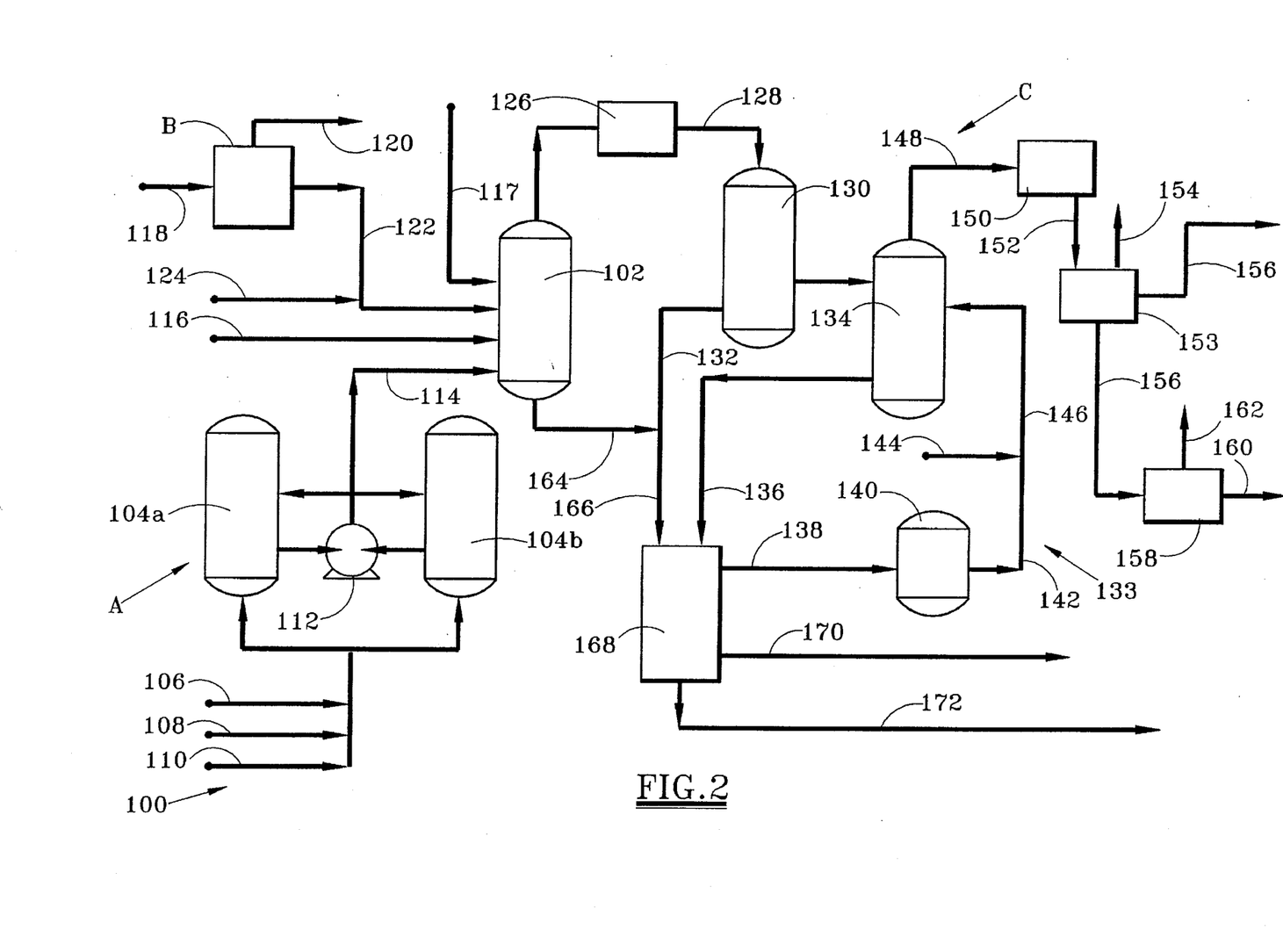
FIG. 2 is a flow diagram of the hydrocarbon conversion process of the present invention employing the reactor of FIG. 1.

Referring to FIG. 2, an in-process, closed-loop, hydrocarbon conversion process 100 of the present invention is shown. The process 100 comprises an upstream process effluent/residual stream accumulation unit A for feeding hydrocarbons to a low temperature transport reactor 102 of the present invention as described above. Oxidant feed to the reactor 102 is provided by an air separation plant B and the reactor effluent gas is desulfurized and purified by a cleanup unit C to give a syngas and/or hydrogen product stream.

The feed accumulation unit A comprises one or more pairs of holding tanks 104a, 104b receiving a plurality of low value liquid and/or solid hydrocarbon streams 106, 108, 110, respectively comprising oily process effluent streams, residual oil streams, and other refinery solids. The hydrocarbon feed streams 106, 108, 110 are pumped by pump 112 via line 114 to the reactor 102 operating in accordance with the present invention at partial oxidation conditions. The tanks 104a, 104b, pump 112 and line 114 are preferably heated to maintain a suitable feed viscosity. Low value hydrocarbon streams which are gaseous such as vent gas are preferably introduced to the reactor 102 directly via line 116. Inert carrier particles are charged to the reactor 102 as needed via line 117.

The air separation plant B separates air introduced through line 118 into its $N_2$ and $O_2$ constituent components by conventional means known in the art. Nitrogen can be withdrawn through line 120 for supply to miscellaneous refinery processes. A substantially pure oxygen stream is withdrawn through line 122 as oxidant feed to the reactor 102. Steam required by the pyrolysis, gasification and shift reactions in the reactor 102 is supplied via line 124. If desired, the steam feed can be combined with the oxygen feed for supply via line 122.

Effluent from the reactor 102 is passed overhead to a particulate disengagement unit (not shown) for separating carrier particles for recirculation. A hot gaseous effluent substantially free of particulate matter is passed from the disengagement unit for feed to a waste heat recovery unit 126. In the heat recovery unit 126, heat supplied to the reactor 102 can be partially recovered for utilities generation, including heating boiler feed water for steam production. A cooled reaction effluent stream is passed through line 128 to a high efficiency filtration unit 130 to further separate any entrained particles from the gaseous stream 128. Examples of suitable filtration devices include cyclones, ceramic filters, inertial separators, electrostatic precipitators, and the like. Solids recovered from the filtration unit 130 are withdrawn through line 132 for further processing as described hereinbelow. The solids stream 132 comprises various non-volatile inorganic compounds present in raw petroleum which are typically recovered as a non-combustible residue (ash) from refinery bottoms streams. The solids stream 132 can also comprise particles of spent FCC catalyst, alumina or other suitable particles used as the carbon deposition substrate.

Gas flitrate from the filter 130 is passed to a quench loop 133 to further cool the reaction effluent and substantially inhibit tar formation. The quench loop 133 includes a quench tower 134 comprising an aqueous quench liquid. A heat exchanger (not shown) is preferably provided for cooling the solids stream 132 by an exchange of heat with quench water removed through line 136 from the quench tower 134. A heated quench water stream from the solids heat exchanger (not shown) is passed via line 138 to a quench tank 140 to dissipate absorbed heat. A cooled quench water stream 142 leaving the quench tank 140 is combined with makeup water from line 144 as needed and recycled via line 146 to the quench tower 134.

A quenched effluent stream leaving the quench tower 134 via line 148 can be passed to an optional sour shift unit 150. The sour shift unit 150 has a catalyst suitable to for reacting carbon monoxide and water to produce additional hydrogen in the presence of sulfides. An effluent stream enriched with hydrogen is passed via line 152 to an acid gas removal unit 153 wherein conventional means are used to absorb the carbon dioxide and hydrogen sulfide therefrom. Separated sulfides are withdrawn via line 154 for feed to a reduction unit (not shown) wherein the sulfides are reduced to elemental sulfur. Carbon dioxide separated from the raw effluent stream is withdrawn via line 156 for further use or venting.

A clean effluent stream withdrawn from the acid gas separation unit 153 is passed via line 156 to a hydrogen separation unit 158 wherein conventional pressure swing absorption or membrane separation means are used to separate the hydrogen product from other components in the effluent stream, mainly carbon monoxide. A purified hydrogen product stream is withdrawn from the hydrogen separation unit 158 via line 160 as a purified product stream suitable for use, for example, in refinery hydrogenation units or in the manufacture of a number of chemicals. A byproduct stream comprising substantially carbon monoxide and/or light hydrocarbons is withdrawn via line 162 for use in methanol manufacture, for example, or as a fuel gas in utilities production.

Solid residues of the process 100 comprising metalized carrier particles, ash, inorganics and the like are purged from the reactor 102 via a purge line 164, and solids separated from the raw effluent gas in the high efficiently filter 130, are combined in line 166. The combined solids stream 166 is then cooled by an exchange of heat against quench water, as mentioned previously, and optionally discharged to a metals leaching and/or solids fixation unit 168. In the unit 168, metals in the metalized carrier particles, ash, and inorganics can be recovered via line 170 as a metals product by conventional leaching methods. Among common metals present in petroleum bottoms streams are nickel, vanadium, iron, and the like transition elements. Solid wastes can also include non-hazardous solids which are recovered via line 172 for disposal.

EXAMPLES

A research-scale transport fluid bed reactor test unit (TRTU) was used in the following examples to show the applicability and performance of a transport reactor in a process of the present invention for converting low value hydrocarbon streams to hydrogen and/or a syngas product. Among the factors studied included: carbon deposition rate, carbon inventory required for supporting endothermic pyrolysis reactions, analysis of products produced and the rate of aromatic ring consumption where an aromatic feed is employed.

The carrier particles comprised spent FCC-type alumina/silica catalyst having a rigid, durable solid form at temperatures substantially between about 870° C. and about 1090° C.

Figure 3:
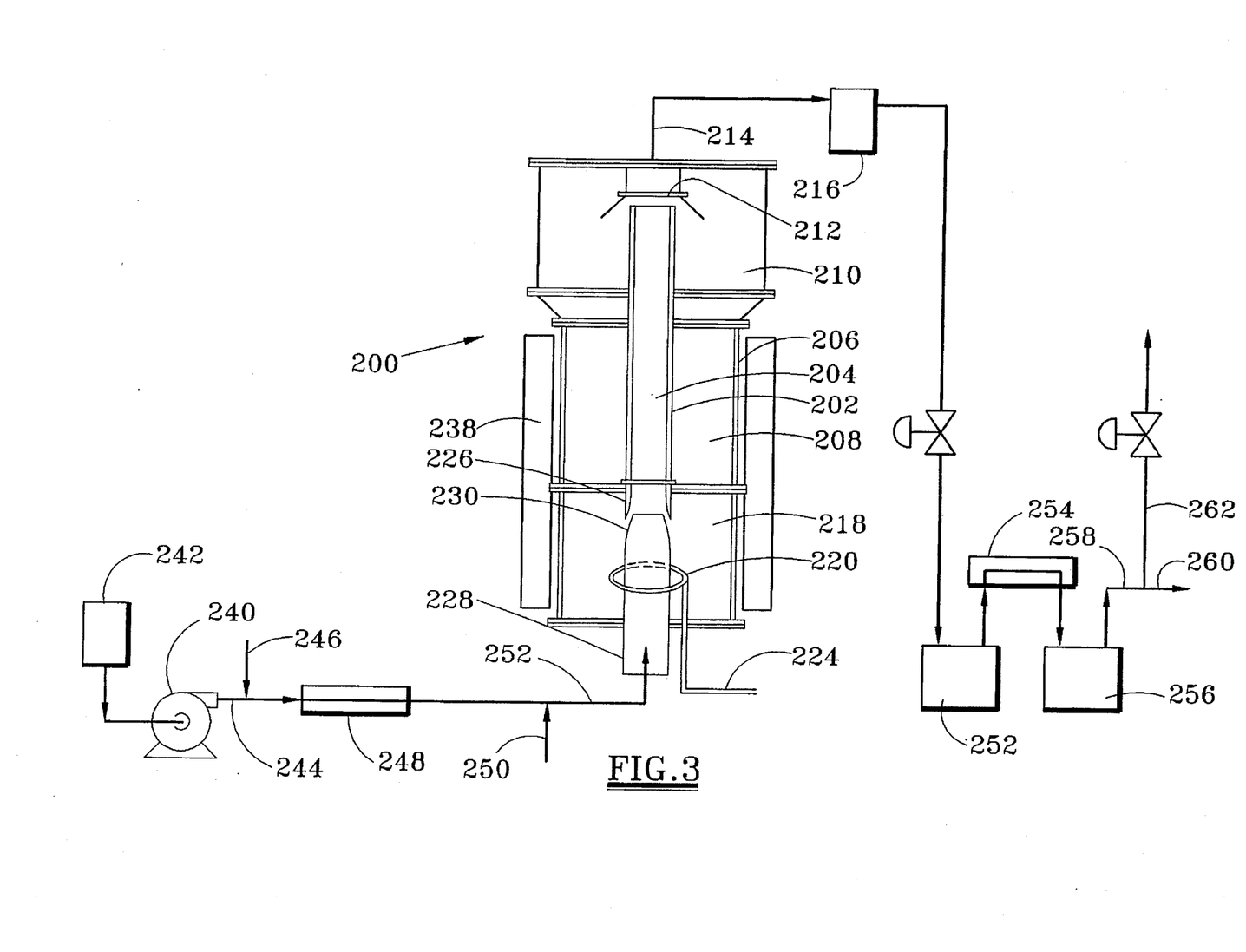
FIG. 3 is a schematic representation of a small transport reactor of the present invention used for evaluating the present hydrocarbon conversion process.

A generalized diagram of the TRTU is shown in FIG. 3. A transport reactor of the present invention 200 designed for a research scale operation comprise a central riser pipe 202 having an inner reaction zone 204. The riser pipe 202 was jacketed by a standpipe 206 forming a carrier accumulation zone 208 in the annular space. A carrier disengagement zone 210 at the outlet of the riser pipe 202 disengaged the fluidized carrier from the product gas. The disengagement zone 210 comprised an inertial strike plate 212. Product gas was removed from the disengagement zone 210 through line 214 for analysis.

A carrier fluidizing zone 218 at the inlet of the riser pipe 202 established a fluidized bed of particles. The particles were fluidized by fluidizing gas which was sparged into the fluidizing zone 218 by a sparger 220 at the outlet of a sparge gas line 224. The fluidized particles were injected into the inlet of the riser pipe 202 by an eductor 226. An inlet pipe 228 having a variable cone valve 230 at an outlet thereof supplied the hydrocarbon feed to the unit 200 as a vapor. The feed vapor also served as an eduction gas to the eductor 226. The eductor 226 was adjustable to control the velocity of gas through the riser 202. The unit included electric heating units 238 jacketing the standpipe 206, and a cooling water jacket (not shown) on the riser pipe 202.

The reactor 200 was made from INCOLOY 800HT. The riser 202 was 9.14 m (30 ft) tall and had a flow area of 1.95 cm$^2$ (0.0021 ft$^2$). The annular flow area of the standpipe 206 was 41.99 cm$^2$ (0.0452 ft$^2$). The reactor 200 included an idle flow line (not shown), but no annulus shut off valve. The heating jacket 238 included six sections of heating elements. The purge and fluidizing gases comprised compressed nitrogen.

A hydrocarbon vapor feed stream comprised an aromatic rubber solvent diluted with nitrogen. The rubber solvent was pumped by pump 240 from a tank 242. A solvent stream 244 was then mixed with steam introduced through line 246 and the combined stream was passed through a heater 248 to vaporize the solvent. The vapor was diluted with nitrogen introduced via line 250and the diluted vapor was fed to the reactor 200 through line 252.

The effluent gas was removed from the reactor 200 to determine the pyrolysis products of the aromatic hydrocarbon feed. A dust filter 216 was used to separate particulate matter from the product gas. The filtered product gas was quenched in a hot separator 252 to prevent formation of tars. The quenched vapor was further cooled by heat exchange with chilled water in a jacketed line 254 and passed to a cold separator 256 to condense aqueous components in the product stream. A gaseous outlet stream was withdrawn from the cold separator 256 via line 258. A portion of the outlet gas 258 was fed via line 260 to a gas chromatograph (GC) (not shown). The remainder of the outlet gas 258 was directed via line 262 to a flare (not shown). Following the above described steam pyrolysis reaction, the reactor 200 was cooled and the carrier medium was recovered to determine the weight percent of carbon from the hydrocarbon feed which was deposited on the carrier.

Example 1

The rubber solvent was steam pyrolyzed in the reactor 200 at a temperature of 900° C. (1650° F.) and a pressure of 0.34 MPa(g) (50 psig). Heat of reaction was supplied by the heating jacket 238. The carrier particles comprising the deposited carbon inventory were accumulated afterwards for analysis. Riser contact time was less than 2 seconds. A steam-deactivated equilibrium FCC catalyst was used as the circulating medium at a 900° C. operating temperature. The nitrogen diluent comprised 75 vol % of the non-condensable products obtained. GC analysis of the gaseous products, weight percent of carbon deposited on the carrier, and calculated carbon material balance are given in the Table.

TABLE

| Example Run | Composition (vol %) | | | | | | | | Carbon Material Balance - kg (lb) | |
|---|---|---|---|---|---|---|---|---|---|---|
| | $H_2$ | $CH_4$ | $C_{2+}$ | CO | $CO_2$ | $N_2$ | Tar* | C* | In | Out |
| 1 | 10.62 | 9.16 | 3.44 | 1.85 | 0.77 | 74.32 | 2.3 | 15.4 | 8.7 (19.1) | 8.2 (18.0) |
| 2 | — | — | — | 3.2 | 3.5 | 93.7 | — | — | — | — |
| 3 | 24.51 | 10.81 | 4.23 | 5.49 | 1.10 | 53.94 | 1.2 | 23.1 | 6.6 (14.5) | 6.3 (13.6) |

*Weight percent of hydrocarbon feed.

Example 2

The reactor 200 was operated at 900° C. (1650° F.) and 0.34 MPa(g) (50 psig) (without the heating jacket 238) to partially oxidize the carbon inventory accumulated on the carrier in Example 1. No additional hydrocarbon feed was supplied. Air was fed to the reactor 200 through line 246 in place of steam. The products of the partial oxidation reaction were then analyzed by GC as in Example 1. Results of the partial oxidation reaction can be seen in the Table.

Example 3

The reactor 200 was operated similarly to the procedure described in Example 1 except that the rubber solvent feed was supplemented with 20 weight percent mixed xylenes, the steam pyrolysis reaction was conducted at 950°–980° C. (1750°–1800° F.) and 0.34 MPa(g) (50 psig), and the substantially carbon-free, steam-deactivated FCC catalyst from Example 2 was used as the carrier medium. Results are given in the Table. In conclusion, substantially all of the carbon produced in the hydrocarbon steam pyrolysis reactions (Examples 1 and 3), was deposited on the circulating carrier. In addition, the aromatic rings were destroyed and the carbon inventory when oxidized provided a sufficient exotherm to make up the heat required for the endothermic reactions. Therefore, adiabatic operation at 870°–1100° C. (1600°–2000° F.) was shown to be feasible.

The present hydrocarbon conversion process and transport reactor are illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

We claim:

1. A method for low temperature conversion of low value hydrocarbon streams to hydrogen or synthesis gas, comprising the steps of:
   (a) introducing a raw hydrocarbon stream into a continuous stream of substoichiometric oxidation products containing finely divided particles from step (a);
   (b) passing the resulting mixture from step (a) through an essentially adiabatic pyrolysis zone under transport conditions to produce an effluent of hydrogen, light hydrocarbons, carbon monoxide and carbon dioxide, and to deposit carbon on the particles;
   (c) recovering the carbon-coated particles from the effluent of step (b) to obtain a synthesis gas essentially free of particles;
   (d) continuously supplying a primary portion of the recovered particles and a substoichiometric amount of reactive oxygen to a partial oxidation zone to form the stream of substoichiometric oxidation products for the hydrocarbon introduction step (a); and
   (e) adjusting the amount of reactive oxygen supplied to the partial oxidation zone in response to substantial fluctuations in the raw hydrocarbon stream, selected from the group consisting of mass flow rate, water content, carbon content of the hydrocarbon, atomic ratio of H:C in the hydrocarbon, and combinations thereof, to maintain an outlet temperature of the pyrolysis zone in step (b) between about 870° C. and about 1090° C., and to obtain particles from the recovery step (c) having an average carbon deposition content between 0.5 and 40 percent by weight.

2. The method of claim 1, wherein the raw hydrocarbon stream comprises an emulsion from an oil-water separator or an air flotation tank.

3. The method of claim 1, wherein the raw hydrocarbon stream contains metal, the metal is sorbed onto the particles in step (b) and the synthesis gas from step (c) is essentially free of metal.

4. The method of claim 1, wherein the particles are supplied to the partial oxidation zone in step (d) at a rate from about 10 to about 250 times the mass flow rate of the raw hydrocarbon stream in step (a).

5. The method of claim 1, wherein oxygen substantially free of nitrogen is fed to the partial oxidation zone in step (d).

6. The method of claim 1, wherein reactive oxygen is supplied to the partial oxidation zone in step (d) in an amount less than about 5 percent of stoichiometric relative to carbon on the particles supplied to the partial oxidation zone.

7. The method of claim 1, further comprising:
   supplying steam to the pyrolysis zone for shift conversion to hydrogen in step (b).

8. The method of claim 1, wherein the raw hydrocarbon stream has a water content from about 0 to about 40 percent by weight, the hydrocarbon contains from 75 to 95 percent carbon on a dry basis, and the hydrocarbon has a dry basis atomic H:C ratio from 0.5 to 4.

9. The method of claim 8, further comprising:
   supplying steam to an inlet of the pyrolysis zone in an amount to provide a weight ratio of water from the steam and the raw hydrocarbon stream to hydrocarbon in the raw hydrocarbon stream of from about 0.3 to about 0.5.

10. The method of claim 7, wherein the hydrocarbon in the raw hydrocarbon stream has a dry basis atomic H:C ratio between 1 and 2.

11. The method of claim 1, wherein the hydrocarbon introduced in step (a) contains aromatic rings, and the synthesis gas and carbon deposited on the inorganic particles from step (c) are essentially free of aromatic ring compounds.

12. The method of claim 1, wherein the particles in step (a) comprise spent fluidized catalytic cracking catalyst.

13. The method of claim 1, wherein the mixture in step (b) includes a minor amount of caustic.

14. The method of claim 1, further comprising the step of quenching the synthesis gas from step (c) to substantially inhibit tar formation.

* * * * *